United States Patent [19]
Holt et al.

[11] 4,056,881
[45] Nov. 8, 1977

[54] METHOD OF MANUFACTURING ELECTRO-OPTICAL CELL

[75] Inventors: Ian Holt, Goodmayes; Hugh Andrew Pincherle, New Barnet, both of England

[73] Assignee: The Rank Organisation Limited, London, England

[21] Appl. No.: 675,554

[22] Filed: Apr. 9, 1976

[30] Foreign Application Priority Data

Apr. 9, 1975 United Kingdom ............... 14545/75

[51] Int. Cl.² ................................................ G02F 1/13
[52] U.S. Cl. .................................. 29/592 R; 156/306; 156/308; 350/160 LC
[58] Field of Search .................. 29/592; 156/308, 306; 350/160 LC

[56] References Cited

U.S. PATENT DOCUMENTS

| | | | |
|---|---|---|---|
| 3,810,815 | 5/1974 | Welhart et al. | 156/306 X |
| 3,834,791 | 9/1974 | Raimbault | 350/160 LC |
| 3,877,790 | 4/1975 | Robinson | 350/160 LC |
| 3,909,930 | 10/1975 | Gurtler | 350/160 LC X |
| 3,960,534 | 6/1976 | Oates | 350/160 LC X |
| 3,994,568 | 11/1976 | King | 350/160 LC |

FOREIGN PATENT DOCUMENTS

2,523,679 11/1975 Germany ..................... 350/160 LC

*Primary Examiner*—Victor A. DiPalma
*Attorney, Agent, or Firm*—Brisebois & Kruger

[57] ABSTRACT

A method of manufacturing an electro-optical cell in which at least one insulating lamina of adhesive material bonded to at least one spacer element and having an opening defining the limits of the cell is introduced between two cell walls, and the walls are then heated and compressed to soften the adhesive material and seal the cell. The cell may have a spacer element in the form of a lamina of plastics material or may have a number of metallic spacer elements which provide electrical connections to conductive elements carried on a wall of the cell.

8 Claims, 6 Drawing Figures

METHOD OF MANUFACTURING ELECTRO-OPTICAL CELL

This invention relates to the manufacture of electro-optical cells, with particular, but not exclusive, reference to the manufacture of liquid crystal display devices.

Electro-optical cells of the kind used in liquid crystal display devices comprise two parallel spaced apart cell walls between which is contained the optically active medium, in the case of a liquid crystal display device a nematic liquid crystal.

An object of the present invention is to provide a method of manufacturing electro-optical cells in which a predetermined spacing between the cell walls can be ensured, without resorting to complicated jigs or tools.

In the method of manufacturing electro-optical cells according to the present invention an electro-optical cell having parallel spaced-apart walls in which one or more spacing elements bonded to at least one insulating lamina of an adhesive material which may readily be softened or melted is or are introduced between two cell walls and the at least one lamina then softened or melted to seal the cell walls and to cause the cell wall spacing to be determined substantially by the thickness of the spacer element or elements.

In practice the at least one lamina will usually be made of thermoplastics material and the cell walls would be pressed together and heated to soften or melt the at least one lamina so that the spacing between the cell walls is equal to the thickness of the one or more spacer elements.

One lamina which acts as a support for several metallic spacer elements may be employed, or alternatively use may be made of a spacer element in the form of a plastics film to both surfaces of which there is applied a lamina of adhesive material which melts or softens at a lower temperature than the said film. In the latter case the plastics film may be passed through a bath containing a solution of the adhesive material in a volatile solvent to coat the film with the solution, and the solvent may then be evaporated to leave a lamina of the adhesive material on each face of the plastics film.

In a preferred application of the invention to the manufacture of liquid crystal display devices, where conductive electrodes are required on the internal surfaces of the cell walls, metallic spacer elements are employed which also comprise electrical conductors which, upon assembly of the cell, make electrical connections to contacts or electrodes on an internal surface of at least one cell wall. In this application of the invention, therefore, the metallic spacer elements serve both to determine accurately the spacing of the cell walls and to provide electrical connections to the internal cell electrodes or contacts. This avoids the need for expensive and bulky edge connections which have hitherto been used in liquid crystal cells, and which have limited reliability.

The present invention also provides, an electro-optical cell having parallel cell walls with conductive elements on at least one internal surface and a number of connector elements which are connected to respective conductive elements, the connector elements being carried by an insulating laminar support and having a thickness which determines the spacing between the cell walls. The connector elements may extend to at least one edge of the cell for connection to external leads.

Manufacture of such an electro-optical cell is greatly facilitated by means of the present invention, particularly since the connector elements can be applied as a printed circuit to the insulating laminar support. The connector elements may comprise parallel conductive strips applied to one face of the laminar support and arranged to make contact with respective contact strips applied to a respective internal surface of one of the cell walls, the contact strips being connected to respective electrodes on the said cell wall surface. The contact strips and associated electrodes may be applied to the cell wall by a printed circuit technique.

According to a further aspect of the invention there is provided an electro-optical cell having parallel cell walls and having a thickness determined by a plastics film, the cell being sealed by laminae of an adhesive material carried on each face of the plastics film and heat treated to bond them to the cell walls to form an hermetic seal.

Two embodiments of the invention will now be described, merely by way of example, with reference to the accompanying purely diagrammatic drawings, in which.

In the drawings corresponding parts of the two embodiments of the invention are referenced by the same numerals.

Figure 1:
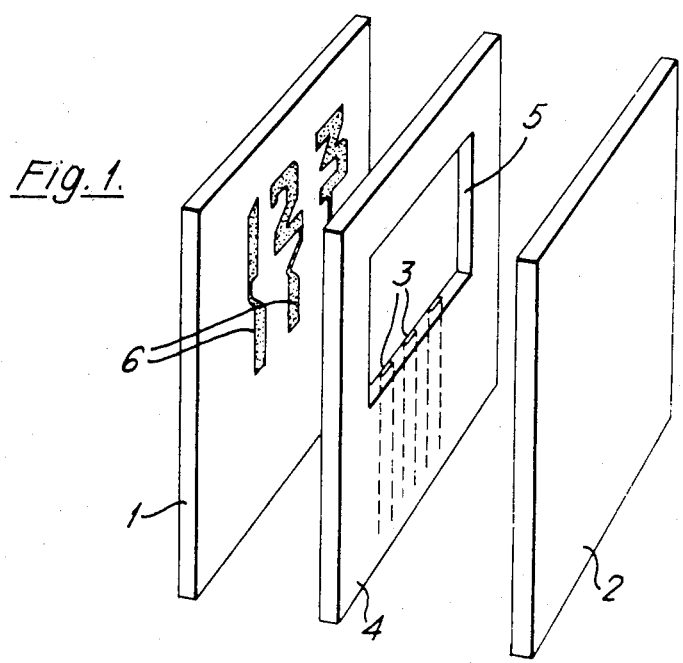
FIG. 1 is a diagrammatic exploded view of an electro-optical cell according to a first embodiment of the invention.
Figure 2:
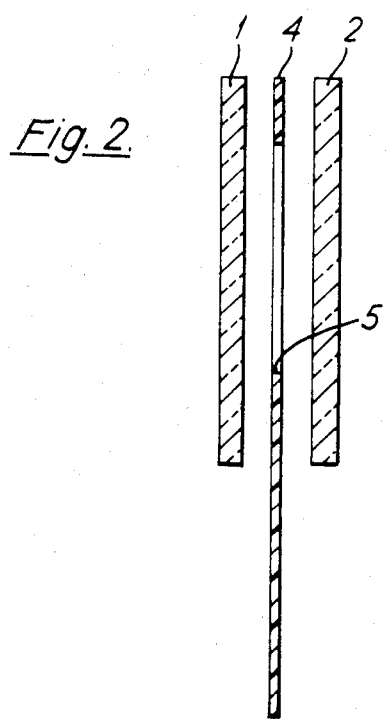
FIG. 2 is a diagrammatic cross-sectional view of the components of the cell shown in FIG. 1.

FIGS. 1 and 2 are exploded views of a liquid crystal display device having two cell walls 1, 2 formed by respective glass plates which, upon assembly of the cell, are maintained parallel to each other and at a predetermined spacing by a number of metallic spacer elements 3 carried by an insulating laminar support 4, the thickness of which is exaggerated in FIG. 1.

Figure 3:
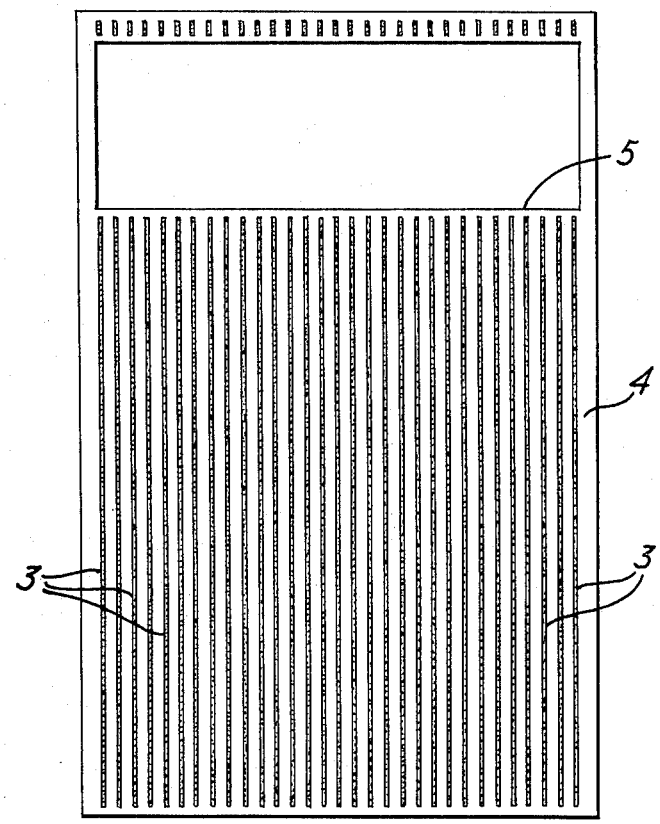
FIG. 3 is a plan view of one face of the laminar support forming part of a cell according to the first embodiment of the invention.

The metallic spacer elements 3 comprise, in this example, parallel metal strips (FIG. 3) which extend over the full length of the laminar support 4 and which are applied thereto by a printed circuit technique or by any other convenient method.

A rectangular window 5 is formed in the laminar support 4 and interrupts the metallic spacer elements 3. When the cell is assembled with the laminar support 4 sandwiched between the cell walls 1 and 2 the window 5 defines a cell the edges of which are sealed hermetically by the laminar support 4. This cell is filled with a liquid crystal (not shown) to form a display device, which in this example is used for the selective display of three numerical characters (FIG. 4).

Figure 4:
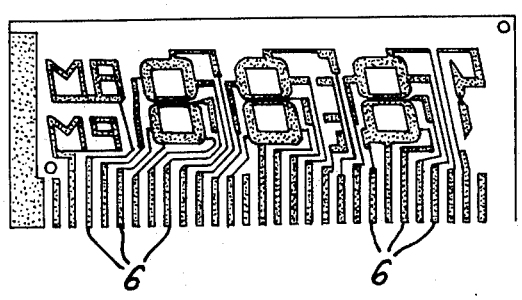
FIG. 4 is a plan view of part of the internal surface of one of the cell walls of a cell similar to that shown in FIGS. 1 and 2.

For the purpose of such display the internal surface of one of the cell walls, 1, is provided, by a printed circuit technique, with a pattern of separate electrodes forming three separate 7-bar displays, each electrode being connected to a separate contact strip 6, as shown in FIG. 4. The contact strips 6 have the same spacing as the parallel spacer elements 3 on the laminar support 4, so that when the cell is assembled with the laminar support 4 in its correct position between the cell walls 1 and 2 the respective spacer elements 3 make electrical contact with the respective contact strips 6, enabling connections to be made to each electrode through the respective spacer elements and contact strips at the outer edge of the laminar support 4 through which the spacer elements 3 emerge.

The other cell wall, 2, is provided with a conductive layer on its internal surface to which connection may be made by a conductive element (not shown) carried by the laminar support 4 and spaced from the spacer elements 3.

The laminar support 4 is made of thermoplastics material and upon assembly of the cell the cell walls 1 and 2 are pressed together and heated locally to melt or soften the thermoplastics material so that the cell walls adopt a spacing which is equal to the thickness of the metallic spacer elements 3.

It will be appreciated that where other means are provided for making electrical connections to the cell electrodes the metallic spacer elements incorporated in the laminar support may be used solely for determining the spacing of the cell walls.

Figure 5:
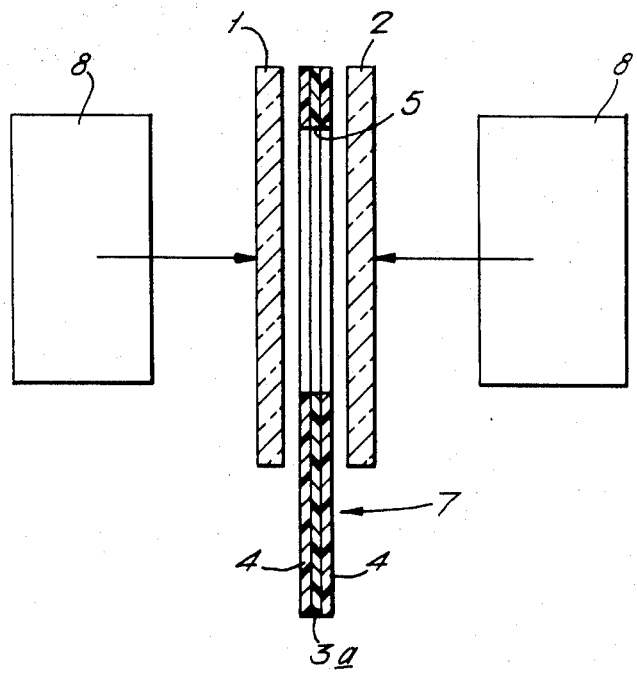
FIG. 5 is a diagrammatic cross-sectional view of the components of a cell according to a second embodiment of the invention, showing, purely diagrammatically the method of manufacturing a cell according to the invention.

FIG. 5 shows two cell walls 1, 2 of a liquid crystal display device, the walls being formed from two glass plates as in the first embodiment of the invention. Between the cell walls 1, 2 is shown a gasket, generally indicated 7, comprising two laminae 4 of thermoplastics material, preferably 'Eastobond' (Registered Trade Mark), and a spacer element in the form of a central film 3a of a thermoplastics material, preferably 'Mellinex' (Registered Trade Mark), which has a higher melting point than the laminae 4.

The thickness of the gasket 7 is exaggerated compared to the walls 1, 2. The film 3a would actually have a thickness of the order of 8 microns, and the laminae 4 would each have a thickness of the order of 8½ microns.

The gasket 7 is itself rectangular and has a rectangular window 5, which is punched from the gasket, and the edges of which define the limits of the cell. It would, however be possible to punch out any desired shape of gasket or window for a particular cell.

The internal surfaces of the cell walls 1, 2 are provided with electrodes (not shown) as in the previous embodiment of the invention but since the spacer element is electrically non-conductive, other means (not shown) are provided for making the electrical connections.

The cell is assembled by means of the press and heating device 8 which compresses the cell components and simultaneously heats the cell walls 1, 2. Heating is carefully controlled so that the temperature of the gasket 7 is raised sufficiently to melt the laminae 4 but not the spacer element 3a. The laminae are made of an adhesive substance which will bond to glass and seal the edges of the cell. Compression by the device 8 reduces the thickness of the gasket 7 until the spacing of the glass plates is determined substantially by the thickness of the unmelted spacer film 3a.

Figure 6:
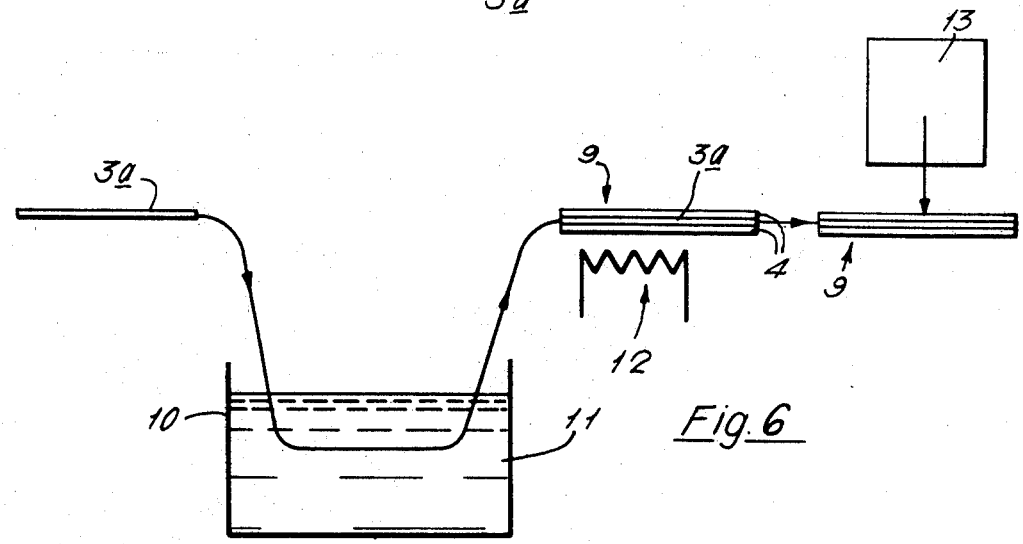
FIG. 6 is a purely diagrammatic view of a method for applying laminae of adhesive material to the spacer element of FIG. 5.

FIG. 6 shows diagrammatically the preparation of a laminate 9 from which gaskets 7 may be punched. The 8mm thick film 3a is passed through a bath 10 containing a chloroform solution 11 of the thermoplastics material of the laminae 4, the passage being controlled such that the film takes up a layer of the thermoplastics material on either side to a total thickness of about 25mm when dry. The resulting laminate 9 is shown at the drying stage, represented diagrammatically by a heater 12.

The dry laminate 9 is then passed to a punch 13 which punches the required gasket 7 with the window 5 from the laminate 9.

We claim:

1. A method of manufacturing an electro-optical cell having parallel spaced-apart walls wherein at least one spacing element bonded to at least one insulating lamina, of an adhesive material which may readily be softened, is introduced between two cell walls and the at least one lamina is then softened to seal the cell walls and to cause the cell wall spacing to be determined substantially by the thickness of the spacer element or elements.

2. A method according to claim 1, wherein the at least one lamina is made of thermoplastic material.

3. A method according to claim 1, wherein the cell walls are pressed together and heated to soften the at least one lamina.

4. A method according to claim 1, wherein one said lamina which acts as a support for a number of metallic spacing elements is employed.

5. A method according to claim 4, wherein the metallic spacer elements comprise electrical conductors which upon assembly of the cell make electrical connections to contacts on an internal surface of at least one cell wall.

6. A method according to claim 1, wherein use is made of a spacer element in the form of a plastics film to both surfaces of which there is applied a lamina of adhesive material which softens at a lower temperature than the said film.

7. A method according to claim 6, wherein, before use, the plastics film is passed through a bath containing a solution of the adhesive material in a volatile solvent to coat the film with the solution, and the solvent is then evaporated to leave a lamina of the adhesive material on both faces of the plastics film.

8. A method according to claim 7 wherein a plastics film having a thickness of the order of 8 microns is used and it is passed through the solution of adhesive material in such a way as to take up laminae of adhesive material each having a thickness when dry of the order of 8½ microns.

* * * * *